US008728664B2

(12) United States Patent
Park et al.

(10) Patent No.: US 8,728,664 B2
(45) Date of Patent: May 20, 2014

(54) ANODE FOR LITHIUM SECONDARY BATTERY AND LITHIUM SECONDARY BATTERY USING THE ANODE

(75) Inventors: Jin-Hwan Park, Seoul (KR); Tae-Byoung Oh, Pohang-si (KR); Dae-Ho Lee, Pohang-si (KR); Kil-Won Cho, Pohang-si (KR)

(73) Assignee: Samsung SDI Co., Ltd., Giheurg-gu, Yongin-si, Gyeonggi-do (KR)

( * ) Notice: Subject to any disclaimer, the term of this patent is extended or adjusted under 35 U.S.C. 154(b) by 2244 days.

(21) Appl. No.: 11/025,114

(22) Filed: Dec. 30, 2004

(65) Prior Publication Data
US 2005/0158624 A1 Jul. 21, 2005

(30) Foreign Application Priority Data
Jan. 17, 2004 (KR) ........................ 10-2004-0003573

(51) Int. Cl.
*H01M 4/13* (2010.01)
*H01M 4/58* (2010.01)
(52) U.S. Cl.
USPC .... 429/217; 429/212; 429/231.9; 429/231.95
(58) Field of Classification Search
CPC H01M 4/621; H01M 10/0525; H01M 10/052
USPC .......... 429/128, 209, 217, 212, 231.95, 231.9
See application file for complete search history.

(56) References Cited

U.S. PATENT DOCUMENTS 6,048,637 A * 4/2000 Tsukahara et al. ............... 429/53
6,428,929 B1 * 8/2002 Koy et al. ...................... 429/217

2004/0258991 A1 12/2004 Choi et al.
2005/0130040 A1 6/2005 Yang et al.
2006/0257739 A1 11/2006 Ryu et al.
2006/0275661 A1 12/2006 Kim et al.

FOREIGN PATENT DOCUMENTS

| CN | 88102012 A | 11/1988 |
| CN | 97116468 | 3/1999 |
| CN | 00132906 | 6/2001 |
| CN | 1328104 A | 12/2001 |
| JP | 59-180797 | 12/1984 |
| JP | 04-255760 | 9/1992 |

(Continued)

OTHER PUBLICATIONS

Office action from the Chinese Patent Office issued in Applicant's corresponding Chinese Patent Application No. 2005-10004358.2 dated Nov. 23, 2007.

(Continued)

*Primary Examiner* — Helen O Conley
(74) *Attorney, Agent, or Firm* — Robert E. Bushnell, Esq.

(57) ABSTRACT

An anode for a lithium secondary battery contains an active material and a binder mixture. The active material can occlude or liberate lithium. The binder mixture includes a synthetic rubber-based latex-type binder, a cellulose-based thickener, and an acrylamide-based water-soluble polymer. The adhesive forces among electrode materials and between the electrode materials and a current collector are greatly increased. As a result, the number of battery defects, which are caused by low adhesive forces in the electrode plate manufacturing process, in particular, a rolling process, can be unexpectedly decreased. At the same time, high-rate discharge characteristics can be improved by decreasing the resistance at the interface between the electrode materials and the current collector.

12 Claims, 1 Drawing Sheet

(56) References Cited

FOREIGN PATENT DOCUMENTS

| | | |
|---|---|---|
| JP | 05-074461 | 3/1993 |
| JP | 11-067213 | 3/1999 |
| JP | 11-250937 | 9/1999 |
| JP | 1999-339810 | 12/1999 |
| JP | 2002-237305 | 8/2002 |
| JP | 2002-270154 | 9/2002 |
| JP | 2002-367677 | 12/2002 |
| JP | 2003-187871 | 7/2003 |
| KR | 1020030026815 A | 4/2003 |

OTHER PUBLICATIONS

Office action from the Japanese Patent Office issued in Applicant's corresponding Japanese Patent Application No. 2005-005284 dated Aug. 5, 2008.

"Request for Entry of the Accompanying Office Action" and "Chinese Patent Certificate for Invention" issued on Mar. 25, 2009 for corresponding Chinese Patent Application No. 200510004358.2.

Korean Registration Determination Certificate issued by Korean Patent Office on Apr. 28, 2010 corresponding Korean Patent Application No. 10-2004-0003573 and Request for Entry of the Accompanying Document attached herewith.

Japanese Office Action issued by Japanese Patent Office on Jul. 20, 2010 corresponding to Korean Patent Application No. 2004-003573 and Request for Entry of the Accompanying Office Action attached herewith.

Request for Entry of the Accompanying Office Action for Korean Office action attached herewith.

Office action from Korean Patent Office issued in Applicant's corresponding Korean Patent Application No. 10-2004-0003573 dated Oct. 22, 2009.

* cited by examiner

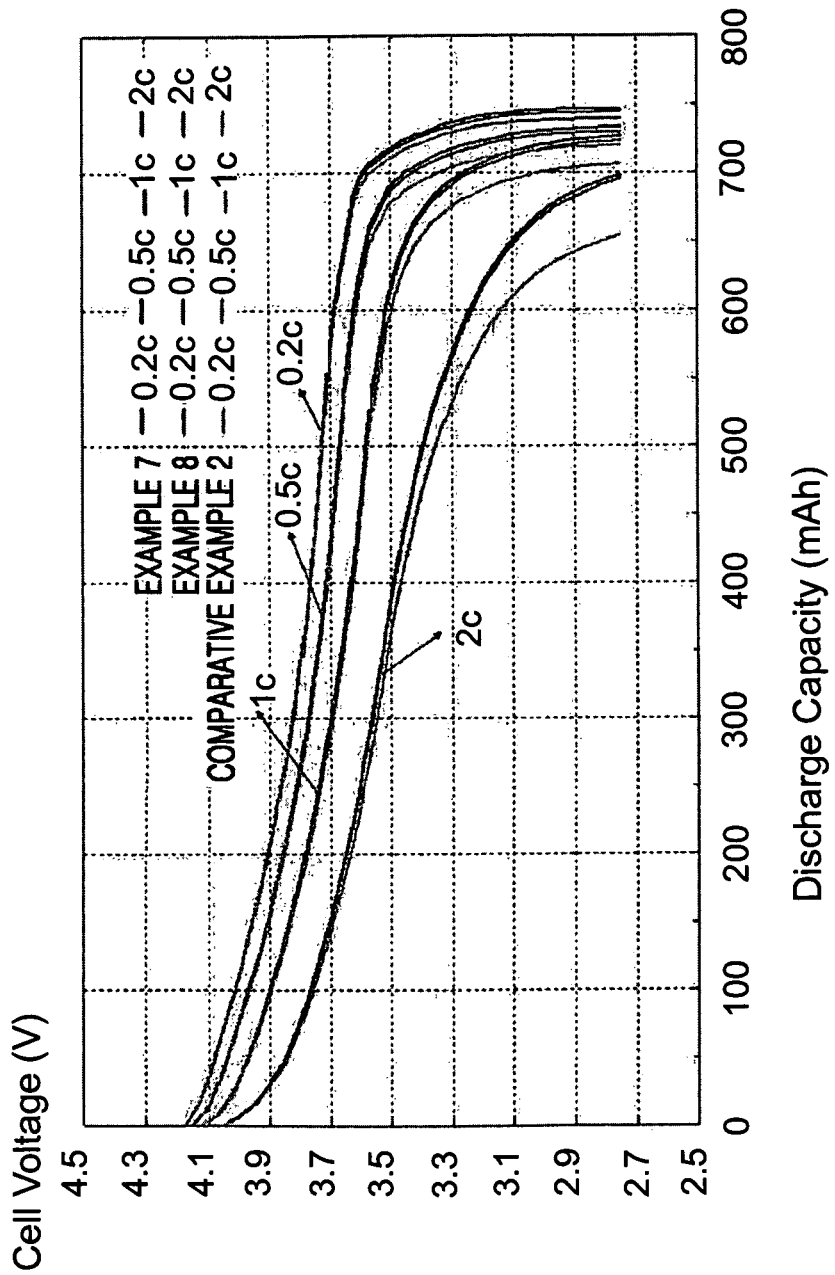

ANODE FOR LITHIUM SECONDARY BATTERY AND LITHIUM SECONDARY BATTERY USING THE ANODE

CLAIM OF PRIORITY

This application makes reference to, incorporates the same herein, and claims all benefits accruing under 35 U.S.C.§119 from an application for ANODE FOR LITHIUM SECONDARY BATTERY AND LITHIUM SECONDARY BATTERY USING THE SAME earlier filed in the Korean Intellectual Property Office on 17 Jan. 2004 and there duly assigned Serial No. 2004-3573.

BACKGROUND OF THE INVENTION

1. Field of the Invention

The present invention relates to a lithium secondary battery, and more particularly, to an anode for a lithium secondary battery in which adhesive forces among electrode materials and between the electrode materials and a current collector are strengthened to improve the characteristics of the anode and to improve battery performance, and a lithium secondary battery including the anode.

2. Description of the Related Art

Secondary batteries have been used as power sources for portable electrical devices, such as mobile phones, PDAs, laptop computers, digital cameras, camcorders and MP3s, electric-powered cars; and the like. Therefore, the demand for the secondary batteries, which can be repeatedly charged and discharged, has soared. In particular, batteries with high performance are in high demand due to the fact that the portability of these portable electrical devices depends on secondary batteries. Among these secondary batteries, rechargeable lithium secondary batteries have 3 times the energy density per unit weight of Pb storage batteries, Ni—Cd batteries, Ni—H batteries, and Ni—Zn batteries. In addition, rechargeable lithium secondary batteries can be charged rapidly. Due to these advantages, research and development of rechargeable lithium secondary batteries has increased.

A lithium-containing transition-metal oxide, a chalcogen compound, such as $MoS_2$, or the like is under consideration as an active cathode material for lithium secondary batteries. Examples of the lithium-containing transition-metal oxide include $LiCoO_2$, $LiNiO_2$, $LiMnO_4$, and the like. An active anode material for lithium secondary batteries is composed of lithium metal, lithium metal alloy, graphite-based or carbon-based materials, or the like. If an anode is composed of a lithium metal, the volume of a lithium metal changes due to the repeated dissolution and precipitation of lithium during the charge/discharge cycle and needle-shaped lithium dentrite grow locally on the lithium metal. The needle-shaped lithium dentrite functions as dead lithium to decrease the charge/discharge efficiency, and can contact the cathode, which causes a short circuit in lithium secondary batteries.

To solve these problems, a compound that can reversibly intercalate and deintercalate lithium has been suggested as an anode material. Examples of the compound include graphite-based or carbonaceous-based materials, lithium-alloys, metal powders, metal oxides, or metal sulfides. However, if a battery is manufactured using a lithium-alloy anode in a sheet form, the sheet-formed alloy becomes thinner during the charge/discharge cycle, thereby degrading the performance of the current collector. As a result, the characteristics of the charge/discharge cycle of the battery deteriorate.

When the sheet-formed electrode is formed using a metal powder, carbonaceous materials, metal oxides, metal sulfides, or the like, a binder is required in the manufacturing process due to the fact that these materials cannot form the electrode alone. For example, Japanese Laid-Open Patent Publication No. HEI 4-255760 relates to the use of an elastic rubber-based polymer material as a binder in manufacturing an electrode using carbonaceous materials.

In a common method of manufacturing an anode for a lithium secondary battery, an organic solvent containing N-methyl-2-pyrrolidon (NMP) is included in the binder. However, NMP is harmful to humans, which makes the manufacturing process complex. In addition, the organic solvent causes pollution when it is discharged. To solve these problems, Japanese Laid-Open Patent Publication No. HEI 5-74461 relates to a method of manufacturing an aqueous active anode material slurry in which water is used as a solvent, and a synthetic rubber-based latex-type binder and a cellulose-based thickener are used.

However, the use of only the synthetic rubber-based latex-type binder and the cellulose-based thickener in the manufacturing process of an anode does not provide sufficient adhesive forces among electrode materials and between the electrode materials and a current collector. As a result, in a rolling process using a roll press subsequent to a coating process in which the aqueous anode slurry is coated on a copper current collector, the electrode materials are separated from the anode in order to adhere to the roll press. The electrode materials adhered to the roll press scratch the anode in a subsequent rolling process, which causes defects in the battery. In addition, in an assembly process, in which lithium secondary batteries are assembled by rolling the electrode, subsequent to the rolling process, the electrode materials are separated from the anode, which occurs in the corners formed by folding the electrode. Furthermore, if a lithium secondary battery contains an anode having weak adhesive forces, an electrical contact between an active anode material and a copper current collector become weak. As a result, the discharge capacity decreases during discharges at high rates.

Therefore, a great amount of research has been focused on the solutions for weak adhesive forces of the anode, in which the synthetic rubber-based latex-type binder and the cellulose-based thickener are used. For example, the adhesive forces can be increased by increasing the amount of the synthetic rubber-based, latex-type binder. However, in this case, the energy density of the anode is lowered, and electrical conductivity among carbonaceous materials is decreased, thereby lowering the performance of the battery. Therefore, the amount of the cellulose-based thickener available must be limited. Due to these problems, there were other trials to increase the adhesive forces by transforming the physical properties of the carboxymethyl cellulose-based thickener.

For example, Japanese Laid-Open Patent Publication No. 1999-067213 relates to a binder containing a polymer latex and carboxymethyl cellulose (CMC), in which a degree of etherfication (DE) is in the range of 0.5-1 and an average degree of polymerization is in the range of 300-1800. Also, Japanese Laid-Open Patent Publication No. 2002-237305 relates to a binder containing a butadiene-containing rubber and carboxymethyl cellulose, in which the degree of etherfication exceeds 0.65. These techniques attempt to find an appropriate degree of etherfication of carboxymethyl cellulose to enhance the adhesive forces among electrode materials and between the electrode materials and the current collector. However, in these cases, the adhesive forces do not meet the desired level. Furthermore, the electrode materials continue to be separated from the anode and adhere to the roll press during the rolling process.

SUMMARY OF THE INVENTION

The present invention provides an anode for a lithium secondary battery, the anode containing a binder capable of increasing adhesive forces to decrease the number of battery defects in the battery caused by weak adhesive forces in an electrode plate manufacturing process, in particular, a rolling process, and to increase battery performance.

The present invention also provides a lithium secondary battery containing the anode.

According to an aspect of the present invention, an anode for a lithium secondary battery is provided, the anode comprising: an active material intercalating and deintercalating lithium; and a binder mixture containing a synthetic rubber-based latex-type binder, a cellulose-based thickener, and an acrylamide-based water-soluble polymer.

The active material preferably contains at least a compound selected from the group consisting of at least one carbonaceous material selected from natural graphite, artificial graphite, coke, and carbonaceous fibers; a lithium-alloy containing Al, Si, Sn, Ag, Bi, Mg, Zn, In, Ge, Pb, or Ti; a composite compound of the carbonaceous material and the lithium-alloy; and a lithium nitride.

The carbonaceous material is preferably modified by the addition of Sn oxides, Si oxides, P, B, or amorphous carbon.

The synthetic rubber-based latex-type binder preferably contains at least a compound selected from styrene butadiene rubber latex, nitrile butadiene rubber latex, methyl methacrylate butadiene rubber latex, chloroprene rubber latex, carboxy modified styrene butadiene rubber latex, and a modified polyorganosiloxane-based polymer latex.

The cellulose-based thickener preferably contains at least a compound selected from carboxy-methyl cellulose, carboxy ethyl cellulose, and hydroxy ethyl cellulose.

The acrylamide-based water-soluble polymer preferably contains at least a compound selected from polyacrylamide, poly(N,N-dimethylacrylamide), and polymethacrylamide.

The amount of the acrylamide-based water-soluble polymer is preferably in the range of 0.1-1.0% by weight based on the total dry weight of an anode composition.

According to another aspect of the present invention, a lithium secondary battery including an anode is provided, the anode comprising: an active material intercalating and deintercalating lithium; and a binder mixture containing a synthetic rubber-based latex-type binder, a cellulose-based thickener, and an acrylamide-based water-soluble polymer.

The active material preferably contains at least a compound selected from the group consisting of at least one carbonaceous material selected from natural graphite, artificial graphite, coke, and carbonaceous fibers; a lithium-alloy containing Al, Si, Sn, Ag, Bi, Mg, Zn, In, Ge, Pb, or Ti; a composite compound of the carbonaceous material and the lithium-alloy; and a lithium nitride.

The carbonaceous material is preferably modified by the addition of Sn oxides, Si oxides, P, B, or amorphous carbon.

The synthetic rubber-based latex-type binder preferably contains at least a compound selected from styrene butadiene rubber latex, nitrile butadiene rubber latex, methyl methacrylate butadiene rubber latex, chloroprene rubber latex, carboxy modified styrene butadiene rubber latex, and a modified polyorganosiloxane-based polymer latex.

The cellulose-based thickener preferably contains at least a compound selected from carboxy-methyl cellulose, carboxy ethyl cellulose, and hydroxy ethyl cellulose.

The acrylamide-based water-soluble polymer preferably contains at least a compound selected from polyacrylamide, poly(N,N-dimethylacrylamide), and polymethacrylamide.

The amount of the acryamide-based water-soluble polymer is preferably in the range of 0.1-1.0% by weight based on the total weight of an anode composition.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein:

FIG. 1 is a graph of high-rate discharge characteristics of lithium batteries manufactured in accordance with Examples 7 and 8 and Comparative Example 2.

DETAILED DESCRIPTION OF THE INVENTION

According to embodiments of the present invention, an anode for a lithium secondary battery is manufactured using an anode composition containing an active anode material and a binder mixture. The binder mixture includes a synthetic rubber-based latex-type binder, a cellulose-based thickener, and an acrylamide-based water-soluble polymer. The use of the binder mixture can stabilize an electrode manufacturing process, and increases dispersion of and adhesive forces of electrode among electrode materials.

Any active anode material that is commonly used in lithium batteries can be used in the present embodiments. The active anode material can contain at least a compound selected from at least one carbonaceous material selected from natural graphite, artificial graphite, coke, and carbonaceous fibers; a lithium-alloy containing Al, Si, Sn, Ag, Bi, Mg, Zn, In, Ge, Pb, or Ti; a composite compound of the carbonaceous material and the lithium-alloy; and a lithium nitride. The carbonaceous material can be modified by the addition of Sn oxides, Si oxides, P, B, or amorphous carbon.

Any anode-current collector that is an electrical conductor, which does not cause chemical changes in lithium batteries, can be used in embodiments of the present invention. The anode-current collector can be stainless steel; Ni; Cu; Ti; C; or Cu or stainless steel having its surface covered with C, Ni, Ti, or Ag. In particular, the anode-current collector can be Cu or Cu alloy, and preferably, Cu.

The synthetic rubber-based latex-type binder according to the present embodiments can contain at least a compound selected from styrene butadiene rubber (SBR) latex, nitrile butadiene rubber (NBR) latex, methyl methacrylate butadiene rubber latex, chloroprene rubber latex, carboxy modified styrene butadiene rubber latex, and a modified polyorganosiloxane-based polymer latex. Such polymer latexes can be in the form of aqueous dispersions. The amount of the polymer latexes in a solid powder form can be in the range of 0.1-20 parts by weight based on the total weight of the active electrode material. If the amount of the polymer latexes is less than 0.1 parts by weight, electrode materials, for example, a current-collecting material can have weak adhesive forces. If the amount of the polymer latexes exceeds 20 parts by weight, the characteristics of the battery deteriorate, which is undesirable.

According to another embodiment of the present invention, the cellulose-based thickener can contain at least a compound selected from carboxymethyl cellulose, carboxy ethyl cellulose, and hydroxy ethyl cellulose. Preferably, the cellulose-based thickener can contain carboxymethyl cellulose in which a hydroxyl group is replaced with a carboxymethyl group by etherification. In general, a terminal carboxyl group is replaced with Na, K, Ca, $NH_4$, or the like. The carboxymethyl cellulose is manufactured by, for example, reacting pulp with sodiumchloroacetate and NaOH. In pulp, cellulose is a polysaccharide in which anhydrous glucose monomer units are linked together, and the glucose monomer unit has 3 hydroxyl groups. Accordingly, in theory, the glucose monomer unit has 3 positions where sodiumchloroacetate can react with, and the amount of sodiumchloroacetate affects the physical properties of carboxymethyl cellulose. The carboxymethyl cellulose manufactured by the above-mentioned manner contains impurities such as NaCl in a large quantity. As a result, the carboxymethyl cellulose is refined using water, sulfuric acid, or the like.

Carboxymethyl cellulose according to the present embodiments can have a degree of etherfication of 0.5 or greater. The degree of etherification acts as an index to identify solubility characteristics of carboxymethyl cellulose, and indicates how many, among the 3 hydroxyl groups, are replaced by the carboxymethyl group. Therefore, in theory, the degree of etherfication can be 3 at a maximum. If a compound has the degree of etherfication of 0.5 or greater, it can dissolve in water. On the other hand, the average degree of polymerization of carboxymethyl cellulose is not limited in the present embodiments. However, in consideration of adhesive forces, the average degree of polymerization of the carboxymethyl cellulose can be in the range of 300-1800.

The amount of the cellulose-based thickener in a solid powder form can be 0.1-20 parts by weight based on the total weight of the electrode active material. If the amount of the cellulose-based thickener is less than 0.1 parts by weight, the electrode active material can have dispersity and adhesive forces which are weak. If the amount of the cellulose-based thickener exceeds 20 parts by weight, the performance of the battery deteriorates.

According to an embodiment of the present invention, the acrylamide-based water-soluble polymer can contain at least a compound selected from polyacrylamide, poly(N, N-dimethylacrylamide), and polymethacrylamide. The weight-average molecular weight (Mw) of the acrylamide-based water-soluble polymer can be in the range of 500-1,000,000. If Mw is less than 500, the adhesive forces decreases. If Mw exceeds 1,000,000, the adhesive forces become too strong, which is undesirable. The acrylamide-based water-soluble polymer has strong affinity with the synthetic rubber-based latex-type binder and the cellulose-based thickener, and sufficient adhesive forces even alone, because it contains an acryl group.

The amount of the acrylamide-based water-soluble polymer can be in the range of 0.1-1.0% by weight based on the total weight of the anode composition. If the amount of the acrylamide-based water-soluble polymer is less than 0.1% by weight, the adhesive forces are not enhanced. If the amount of the acrylamide-based water-soluble polymer exceeds 1.0% by weight, the proportional amount by weight of the active anode material with respect to the entire anode composition decreases. As a result, electrical conductivity, energy density, and the characteristics of high-rate discharge of the lithium secondary battery all decrease.

A lithium secondary battery according to embodiments of the present invention includes a cathode containing a lithium composite oxide, an organic electric solution, a separator, and an anode manufactured according to embodiments of the present invention.

A method of manufacturing the lithium secondary battery will now be described.

First, an active cathode material, a conductor, a binder, and a solvent are mixed to prepare an active cathode material composition. The active cathode material composition is directly coated on an aluminum current collector, and then dried to prepare a cathode plate. Alternately, the active cathode material composition can be cast onto a separated support, detached from the separated support, and laminated on an aluminum current collector, thereby forming a cathode plate.

The active cathode material can be a lithium-containing metal oxide, and preferably, $LiNi_{1-x}Co_xM_yO_2$ where $0=X=0.2$, M=Mg, Ca, Sr, Ba, or La, and $0.001=Y=0.02$, $LiCoO_2$, $LiMn_xO_{2x}$, or $LiNi1-xMn_xO_{2x}$ (x=1 or 2). The conductor can be carbon black. The binder can be vinylidenefluoride/hexafluoropropylene copolymer, polyvinylidenefluoride, polyacrylonitirile, polymethylmethacrylate, polytetrafluoroethylene, or a mixture thereof. In the present embodiments, the amounts of the active cathode material, the conductor, the binder, and the solvent are the same as those used in conventional methods of manufacturing lithium secondary batteries.

The process for manufacturing an anode plate is similar to that of the cathode electrode plate. Water as a solvent, an active anode material, a synthetic rubber-based latex-type binder, a cellulose-based thickener, and an acrylamide-based water-soluble polymer are mixed to prepare an active anode material composition slurry. A copper current collector is directly coated with the active anode material composition slurry to obtain the anode plate. Alternatively, the active anode material composition slurry is cast onto a separated support, detached from the separated support, and finally laminated on a copper current collector, thereby forming an anode plate.

Any separator that is commonly used in lithium batteries can be used in the present embodiments. In particular, a separator composed of polyethylene, polypropylene, or the like, which can be rolled, can be used for a lithium ion battery, and a separator that can retain a large amount of an organic electrolytic solution can be used for a lithium polymer battery. A method of manufacturing a separator will now be described.

A polymer resin, a filler, a plasticizer, and a solvent are mixed to prepare a separator composition. The separator composition is directly coated on an electrode, and then dried to form a separator film. Alternately, the separator composition can be cast onto a support, dried, detached from the support, and laminated on an upper portion of an electrode, thereby forming a separator film.

Any polymer resin that is commonly used for binders of electrode plates can be used in the present embodiments. Examples of the polymer resin include vinylidenefluoride/hexafluoropropylene copolymer, polyvinylidenefluoride, polyacrylonitrile, polymethylmethacrylate, and a mixture thereof. In particular, the polymer resin can be a vinylidenefluoride/hexafluoropropylene copolymer in which the amount of hexafluoropropylene is in the range of 8-25% by weight.

The organic electrolytic solution contains a lithium salt and an organic solvent. It is preferable to use a lithium salt having low lattice energy so that it can be easily dissociated and has the high ionic conductivity. Moreover, thermal safety and oxidation resistance of the salt should be sufficient. The lithium salt and the organic solvent can be used separately in isolation or in a selective compound. The lithium salt can have a concentration of 0.4M-10.5M. Within this range, the ionic conductivity of the lithium salt at a maximum in the organic electrolytic solution. Any lithium salt that is commonly used in lithium secondary batteries can be used in the present embodiments. Examples of the lithium salt include at least a compound selected from $LiPF_6$, $LiBF_4$, $LiClO_4$, $Li(CF_3SO_2)_2$, $LiCF_3SO_3$, $LiSbF_6$, and $LiAsF_6$.

In addition, the organic solvent must have low reactivity with lithium metals as well as high permittivity and low viscosity, to increase ionic conductivity by facilitating ionic dissociation. In general, the organic solvent is composed of at least two solvents, and is preferred to include an organic solvent having high permittivity and high viscosity and an organic solvent having low permittivity and low viscosity. For example, it is preferable that the organic solvent can be a mixture of cyclic carbonate and linear carbonate. The cyclic carbonate can be selected from polyethylene carbonate, ethylene carbonate, and propylene carbonate. The linear carbonate can be selected from dimethyl carbonate and diethyl carbonate.

The separator is interposed between the cathode plate and the anode plate to form an electrode assembly. The electrode assembly is wound or folded, and then sealed in a cylindrical or rectangular battery case. The organic electrolytic solution is injected into the battery case to completely form a lithium ion battery. Alternatively, the electrode assemblies can be stacked upon one another to form a bi-cell structure, soaked in an organic electrolytic solution, and sealed in a pouch to completely form a lithium battery.

The present invention will be described in greater detail with reference to the following examples. The following examples are for illustrative purposes and are not intended to limit the scope of the present invention.

EXAMPLE 1

Manufacture of Anode

Prepared were, as an anode composition, 97% by weight of artificial graphite powder (purchased from Japan Carbon Co., Ltd.), 1.4% by weight of styrene butadiene rubber, 1.5% by weight of carboxymethyl cellulose sodium salt, and 0.1% by weight of polyacrylamide. Then, the above-measured carboxymethyl cellulose sodium salt was added to distilled water, and stirred to form a 1% by weight carboxymethyl cellulose sodium salt aqueous solution. The artificial graphite powder, styrene butadiene rubber, and polyacrylamide, which were measured above, were added to the carboxymethyl cellulose sodium salt aqueous solution, and then mixed in a plastic bottle. Distilled water and ceramic balls were added to the mixed solution, and then stirred for 10 hours. The resultant mixture was cast onto a 12 μm thick copper foil by a 300 μm-spaced doctor blade, dried in an oven at a temperature of about 90° C. for about 10 hours, roll-pressed, and cut to a predetermined size to produce a 120 μm thick anode plate.

EXAMPLE 2

Manufacture of Anode

An anode plate was manufactured in the same manner as in Example 1, except that 97% by weight of artificial graphite powder, 1.2% by weight of styrene butadiene rubber, 1.5% by weight of carboxymethyl cellulose sodium salt, and 0.3% by weight of polyacrylamide were prepared as an anode composition.

EXAMPLE 3

Manufacture of Anode

An anode plate was manufactured in the same manner as in Example 1, except that 96% by weight of artificial graphite powder, 1.5% by weight of styrene butadiene rubber, 1.5% by weight of carboxymethyl cellulose sodium salt, and 1.0% by weight of polyacrylamide were prepared as an anode composition.

EXAMPLE 4

Manufacture of Anode

An anode plate was manufactured in the same manner as in Example 1, except that 1.4% by weight of nitril butadiene rubber was used instead of 1.4% by weight of styrene butadiene rubber.

EXAMPLE 5

Manufacture of Anode

An anode plate was manufactured in the same manner as in Example 1, except that 0.1% by weight of poly(N,N-dimethylacrylamide) was used instead of 0.1% by weight of polyacrylamide.

EXAMPLE 6

Manufacture of Anode

An anode plate was manufactured in the same manner as in Example 1, except that 1.5% by weight of carboxyethyl cellulose was used instead of 1.5% by weight of carboxymethyl cellulose.

EXAMPLES 7 THROUGH 12

Manufacture of Lithium Secondary Battery

Mixed were 96% by weight of $LiCoO_2$, 2% by weight of PVDF as a binder, and 2% by weight of a carbon conductor. In this case, the addition of the carbon conductor facilitates the migration of electrons. Then, the mixture was added to N-methyl-pyrrolidone (NMP) and ceramic balls in a plastic bottle, and stirred for 10 hours. The resultant mixture was cast onto a 15 μm thick aluminum foil by a 250 μm-spaced doctor blade, dried in an oven at about 110° C. for about 12 hours to fully evaporate the NMP, roll-pressed, and finally cut to a predetermined size to form a 95 μm thick cathode plate.

A 20 μm thick polyethylene/polypropylene multi-porous membrane (available from Hoest Cellanese, U.S.A.) was used as a separator.

The separator was interposed between the cathode and the anode plates manufactured in Examples 1 through 6, and rolled into a jelly-roll electrode assembly. The electrode assembly was placed in a rectangular aluminum battery case, followed by injection of an organic electrolytic solution and was then sealed to form a 720-mAh lithium secondary battery.

The organic electrolytic solution was prepared by dissolving 1.1 M LiPF6 in 5.3 g of an organic solvent mixture of ethylene carbonate (EC), ethyl methyl carbonate (EMC), propylene carbonate (PC), and fluorobenzene (FB) in a ratio of 30:55:5:10 by volume.

COMPARATIVE EXAMPLE 1

Manufacture of Anode

An anode plate was manufactured in the same manner as in Example 1, except that 97% by weight of artificial graphite powder, 1.5% by weight of styrene butadiene rubber, and 1.5% by weight of carboxymethyl cellulose sodium salt were prepared as an anode composition.

COMPARATIVE EXAMPLE 2

Manufacture of Lithium Secondary Battery

A Lithium secondary battery was manufactured in the same manner as in Example 7, except that the anode plate manufactured in Comparative Example 1 was used.

EXPERIMENTAL EXAMPLE 1

Peeling Strength Test

In order to measure the adhesive forces of the anode plates manufactured in Examples 1-6 and Comparative Example 1, a tension tester was used to measure peeling strength of the anode plates. A specimen for the peeling strength test was prepared by cutting a plate, which had been very recently roll-pressed, to 12 cm wide and 2.54 cm long. Then, one surface of the plate was taped with a double-coated tape 3 cm wide and 2.54 cm long. The taped surface of the plate was attached to a slide glass having a larger area than the plate specimen, to be used in the peeling strength test. One grip of the tension tester was fixed on the slide glass, and the other grip was fixed on the second surface of the plate which was not in contact with the slide glass. Then, the force required to separate the two grips was measured. The results are shown in Table 1.

TABLE 1

|  | Peeling Strength (gf/mm) |
| --- | --- |
| Example 1 | 0.42 |
| Example 2 | 0.45 |
| Example 3 | 0.47 |
| Example 4 | 0.41 |
| Example 5 | 0.42 |
| Example 6 | 0.42 |
| Comparative Example 1 | 0.22 |

In Table 1, anode plates manufactured in accordance with Examples 1-6 showed higher peeling strengths than those manufactured in accordance with Comparative Example 1. The enhanced adhesive forces is expected to induce a decrease in the number of battery defects, which were due to low adhesive forces, and improved performance of the lithium secondary battery, in particular, high-rate discharge characteristics.

EXPERIMENTAL EXAMPLE 2

Tackiness Test to a Roll Press

A tackiness test was carried out on the anode plates manufactured in accordance with Examples 1-6 and Comparative Example 1, to measure defects that are caused by electrode materials attached to a roll press in the rolling process. In the testing process, a 10 m long anode plate was rolled, measuring the number of portions of the anode plate where electrode materials were separated. The results are shown in Table 2.

TABLE 2

|  | Number of defects |
| --- | --- |
| Example 1 | 1 |
| Example 2 | 0 |
| Example 3 | 0 |
| Example 4 | 1 |
| Example 5 | 2 |
| Example 6 | 1 |
| Comparative Example 1 | 9 |

In Table 2, the defects were unexpectedly decreased on the anode plates manufactured Examples 1-6 compared with that manufactured in Comparative Example 1, in the rolling process.

EXPERIMENTAL 3

Measurement of Lithium Secondary Battery Characteristics

In order to measure high-rate characteristics of a lithium secondary battery with respect to an anode composition, the high-rate characteristics of lithium secondary batteries manufactured in accordance with Examples 7 and 8 and Comparative Example 2 were measured. The results are shown in FIG. 1. FIG. 1 is a graph of the discharge capacity of a lithium secondary battery having a rated capacity of 720 mAh. The lithium secondary battery was charged at 0.5 C rate and discharged at 0.2 C, 0.5 C, 1 C, and 2 C rate, respectively. In addition, a ratio (%) of the discharge capacity to the rated capacity, which is obtained from the results in FIG. 1, are shown in Table 3.

TABLE 3

|  | 0.2 C | 0.5 C | 1 C | 2 C |
| --- | --- | --- | --- | --- |
| Example 7 | 104% | 102% | 101% | 97% |
| Example 8 | 103% | 101% | 101% | 97% |
| Comparative Example 2 | 103% | 100% | 98% | 91% |

Referring to Table 3, the lithium secondary battery manufactured in accordance with Comparative Example 2 had a discharge capacity that is 91% of the rated capacity at a discharging speed of 2C. On the other hand, the lithium secondary batteries manufactured in accordance with Examples 7 and 8 had a discharge capacity that is 97% of the rated capacity at a discharging speed of 2C. Accordingly, it was confirmed that the lithium secondary battery containing the anodes according to the present embodiments had improved high-rate characteristics. That is, the anodes according to embodiments of the present invention have improved high-rate characteristics due to the low levels of interfacial resistance between electrode materials and a current collector.

According to the present invention, adhesive forces among electrode materials and between electrode materials and a current collector can be greatly enhanced. Therefore, defects, which can be caused by the lack of the adhesive forces in the plate manufacturing process, in particular, a rolling process, can be decreased. At the same time, high-rate discharge characteristics can be improved by decreasing the resistance at the interface between the electrode materials and a current collector.

While the present invention has been particularly shown and described with reference to exemplary embodiments thereof, it will be understood by those of ordinary skill in the art that various changes in form and details can be made therein without departing from the spirit and scope of the present invention as defined by the following claims.

What is claimed is:

1. An anode for a lithium secondary battery, the anode comprising:
an active material intercalating and deintercalating lithium; and
a binder mixture containing a synthetic rubber-based latex-type binder, a cellulose-based thickener, and an acrylamide-based water-soluble polymer, wherein the acrylamide-based water-soluble polymer is in the range of 0.1-1.0% by weight based on the total dry weight of the anode composition.

2. The anode of claim 1, wherein the active material contains at least a compound selected from the group consisting of at least one carbonaceous material selected from natural graphite, artificial graphite, coke, and carbonaceous fibers;
a lithium-alloy containing Al, Si, Sn, Ag, Bi, Mg, Zn, In, Ge, Pb, or Ti;
a composite compound of the carbonaceous material and the lithium-alloy; and
a lithium nitride.

3. The anode of claim 2, wherein the carbonaceous material is modified by the addition of Sn oxides, Si oxides, P, B, or amorphous carbon.

4. The anode of claim 1, wherein the synthetic rubber-based latex-type binder contains at least a compound selected from styrene butadiene rubber latex, nitrile butadiene rubber latex, methyl methacrylate butadiene rubber latex, chloroprene rubber latex, carboxy modified styrene butadiene rubber latex, and a modified polyorganosiloxane-based polymer latex.

5. The anode of claim 1, wherein the cellulose-based thickener contains at least a compound selected from carboxy-methyl cellulose, carboxy ethyl cellulose, and hydroxy ethyl cellulose.

6. The anode of claim 1, wherein the acrylamide-based water-soluble polymer contains at least a compound selected from polyacrylamide, poly(N, N-dimethylacrylamide), and polymethacrylamide.

7. A lithium secondary battery including an anode, the anode comprising:
an active material intercalating and deintercalating lithium; and
a binder mixture containing a synthetic rubber-based latex-type binder, a cellulose-based thickener, and an acrylamide-based water-soluble polymer, wherein the acrylamide-based water-soluble polymer is in the range of 0.1-1.0% by weight based on the total dry weight of the anode composition.

8. The lithium secondary battery of claim 7, wherein the active material contains at least a compound selected from the group consisting of at least one carbonaceous material selected from natural graphite, artificial graphite, coke, and carbonaceous fibers; a lithium-alloy containing Al, Si, Sn, Ag, Bi, Mg, Zn, In, Ge, Pb, or Ti; a composite compound of the carbonaceous material and the lithium-alloy; and a lithium nitride.

9. The lithium secondary battery of claim 8, wherein the carbonaceous material is modified by the addition of Sn oxides, Si oxides, P, B, or amorphous carbon.

10. The lithium secondary battery of claim 7, wherein the synthetic rubber-based latex-type binder contains at least a compound selected from styrene butadiene rubber latex, nitrile butadiene rubber latex, methyl methacrylate butadiene rubber latex, chloroprene rubber latex, carboxy modified styrene butadiene rubber latex, and a modified polyorganosiloxane-based polymer latex.

11. The lithium secondary battery of claim 7, wherein the cellulose-based thickener contains at least a compound selected from carboxy-methyl cellulose, carboxy ethyl cellulose, and hydroxy ethyl cellulose.

12. The lithium secondary battery of claim 7, wherein the acrylamide-based water-soluble polymer contains at least a compound selected from polyacrylamide, poly(N, N-dimethylacrylamide), and polymethacrylamide.

* * * * *